United States Patent [19]
Choi

[11] Patent Number: 5,650,990
[45] Date of Patent: Jul. 22, 1997

[54] DISC TRAY IN A MINI-DISC PLAYER WITH AN ELASTICALLY MOUNTED GUIDE ROLLER

[75] Inventor: Hyungho Choi, Ahnyang, Rep. of Korea

[73] Assignee: Daewoo Electronics Co., Ltd., Seoul, Rep. of Korea

[21] Appl. No.: 712,214

[22] Filed: Sep. 11, 1996

Related U.S. Application Data

[63] Continuation of Ser. No. 294,028, Aug. 24, 1994, abandoned.

[30] Foreign Application Priority Data

Aug. 28, 1993 [KR] Rep. of Korea ............ 93-16928

[51] Int. Cl.$^6$ .................................................. G11B 15/675
[52] U.S. Cl. ............................... 369/77.2; 360/99.06
[58] Field of Search ........................... 369/77.2, 77.1; 360/99.02, 99.06, 96.5, 94, 93; 226/190, 191, 194

[56] References Cited

U.S. PATENT DOCUMENTS

| | | | |
|---|---|---|---|
| 3,132,787 | 5/1964 | Rayfield | 226/194 |
| 3,777,965 | 12/1973 | Maiershofer et al. | 226/194 |
| 4,497,051 | 1/1985 | Takahashi et al. | 369/77.1 |
| 4,791,509 | 12/1988 | Rademacher | 360/94 |
| 5,046,169 | 9/1991 | Tsujino | 360/96.5 |
| 5,323,281 | 6/1994 | Park | 360/96.5 |
| 5,402,405 | 3/1995 | Shiomi | 360/94 |

*Primary Examiner*—Stuart S. Levy
*Assistant Examiner*—Kevin M. Watkins
*Attorney, Agent, or Firm*—Nixon & Vanderhye

[57] ABSTRACT

A disk tray wherein the friction is reduced during the loading or unloading operation of a disk cartridge to thereby avoid the damage of the disk cartridge is disclosed. A guiding apparatus for guiding the disk cartridge is elastically provided on an upper portion of the main body of the disk tray to reduce a friction between the upper portion of the main body and the disk cartridge which occurs during an insertion or ejection of the disk cartridge. The guiding apparatus is rotatable due to the friction with the disk cartridge. The guiding apparatus includes a roller rotatable due to a friction with the disk cartridge during the insertion or ejection of the disk cartridge, which is inserted in a receiving portion formed at an upper portion of the main body, a supporting bracket for rotatably supporting the roller on both sides at both ends of a rotation axis of the roller and a spring between the supporting bracket and an inner upper surface of the receiving portion for buffering a rotation of the roller. The guiding apparatus is elastically installed by using a buffering means such as a spring and buffers the shock which occurs when the disk cartridge becomes in contact with the disk tray and rotates due to the friction therebetween. Accordingly, the disk cartridge may be loaded into and unloaded from the disk tray without any damages.

4 Claims, 3 Drawing Sheets

DISC TRAY IN A MINI-DISC PLAYER WITH AN ELASTICALLY MOUNTED GUIDE ROLLER

This is a continuation of application Ser. No. 08/294,028, filed Aug. 24, 1994, now abandoned.

BACKGROUND OF THE INVENTION

1. Field of the Invention

The present invention relates to a disk tray in mini-disk player, and more particularly to a disk tray in a mini-disk player wherein loading or unloading of a disk cartridge can be performed smoothly.

2. Prior Arts

Recently, as an audio or image device, a disk player has been widely used. In such a disk player, after a number of pits are formed on a surface of a disk to record data, a laser beam is projected onto the disk surface while rotating the disk at a high speed and light reflected the disk is optically read out and converted into an electric signal for reproduction of an image and/or sound or other data.

The disk is mounted directly on a disk tray or inserted into a disk cartridge and then the disk tray receiving the disk or the disk cartridge is moved so that the disk is located under the head of a disk driving apparatus. A mini-disk player wherein a disk cartridge can be used is disclosed in U.S. Pat. Nos. 4,731,775 (issued to Katsuyama et al.) and 4,879,616 (issued to Shigeru Ando). The disk tray disclosed in the above U.S. patents is mounted on a main body for supporting and driving the disk tray. On both sides of the main body, guide pieces each having a guide hole for guiding the disk tray in horizontal and vertical direction are provided. On both sides of the disk tray, guide rollers, each corresponding to a guide hole and being inserted into a guide hole, are provided. Further, on at least one side of the disk tray, a driving apparatus is provided for transmitting a driving force from a driving motor installed in the main body to the disk tray.

When the driving motor provided in the main body is driven, the driving force is transferred to the driving apparatus of the disk tray and then is further transferred to the disk tray to reciprocate the disk tray horizontally and move the disk vertically. In this manner, the disk cartridge receiving the disk is loaded onto or unloaded from a turntable.

FIG. 1 is a schematic perspective view for showing a conventional disk tray. Referring to FIG. 1, the above conventional disk tray 10 has a hexahedron with front, rear and lower faces opened. From the lower ends of the side faces thereof, cartridge supporting pieces 14 are extended to the inner portion of disk tray 10 for supporting a disk cartridge which is inserted into or ejected from disk tray 10. On the outer sidewall portions, tray guide rods 16 are provided. Both sidewalls of a main body 20 supporting disk tray 10 have guide holes 24. Each of guide rods 16 is inserted into each of guide holes 24, respectively. The driving force of a loading motor (not shown) installed in the main body is transferred to disk tray 10 via a driving apparatus (not shown) so that disk tray 10 is guided along guide holes 24 in a forward and a backward direction. Thus, disk tray is loaded onto or unloaded from the turntable.

When using the above conventional disk tray, the disk cartridge is damaged due to the friction which occurs during the loading or unloading operation of the disk cartridge into or from disk tray 10. For inserting or ejecting the disk cartridge into or from the disk tray without such a damage, the disk tray must be manufactured by using a particular material which can provide a high smoothness (or enough slide of the disk cartridge). However, such a material is very expensive and therefore, manufacturing the disk tray is defective in view of economics.

SUMMARY OF THE INVENTION

Accordingly, it is an object of the present invention to provide a disk tray which can be manufactured by using a general material wherein the friction is reduced during the loading or unloading operation of a disk cartridge to thereby avoid the damage of the disk cartridge.

To accomplish the above object of the present invention, there is provided a disk tray for receiving a disk cartridge comprising:

a main body having a hexahedron shape with front, rear and lower faces opened;

cartridge supporting pieces extending from lower ends of side faces of the main body to an inner portion of the main body for supporting the disk cartridge which is inserted into or ejected from the disk tray; and means for guiding the disk cartridge, elastically provided on an upper portion of the main body to reduce a friction between the upper portion of the main body and the disk cartridge which occurs during an insertion or ejection of the disk cartridge, the guiding means being rotatable due to the friction with the disk cartridge.

The guiding means may include for example, a roller rotatable due to a friction with the disk cartridge during the insertion or ejection of the disk cartridge;

a receiving portion for receiving the roller provided at an upper portion of the main body; and a supporting bracket for rotatably supporting the roller on both sides at both ends of a rotation axis of the roller. Preferably, the receiving portion is provided with vertically extended holes at both side walls and the roller is provided with a rotation shaft which passes through holes in both sides of the supporting bracket and is inserted into the vertically extended holes, and the disk tray further has a spring between the supporting bracket and an inner upper surface of the receiving portion for buffering a rotation of the roller.

In accordance with one preferred embodiment of the present invention, the disk tray may further have a pair of guide rods for guiding movement of the disk tray, the guide rods being protrudingly formed on opposing portions of both sides of the disk tray and the guide rods being inserted into a pair of opposing guide holes formed at both side of a body of a disk player. Further, a driving rod may be formed on at least one side of the disk tray for receiving a driving force from a driving motor of a body of a disk player.

The disk tray in accordance with the present invention may be manufactured by using a cheap material which does not require the smoothness. On the inner upper surface of the disk tray, the guiding means is elastically installed by using a buffering means such as a spring. The guiding means buffers the shock occurred when the disk cartridge comes in contact with the disk tray and rotates due to the friction therebetween. Accordingly, the disk cartridge may be loaded into and unloaded from the disk tray without any damages.

BRIEF DESCRIPTION OF THE DRAWINGS

The above objects and other advantages of the present invention will become more apparent by describing in detail a preferred embodiment thereof with reference to the attached drawings in which.

DESCRIPTION OF THE PREFERRED EMBODIMENT

Hereinafter, the disk tray according to the present invention will be described in details with reference to the accompanying drawings.

Figure 1:
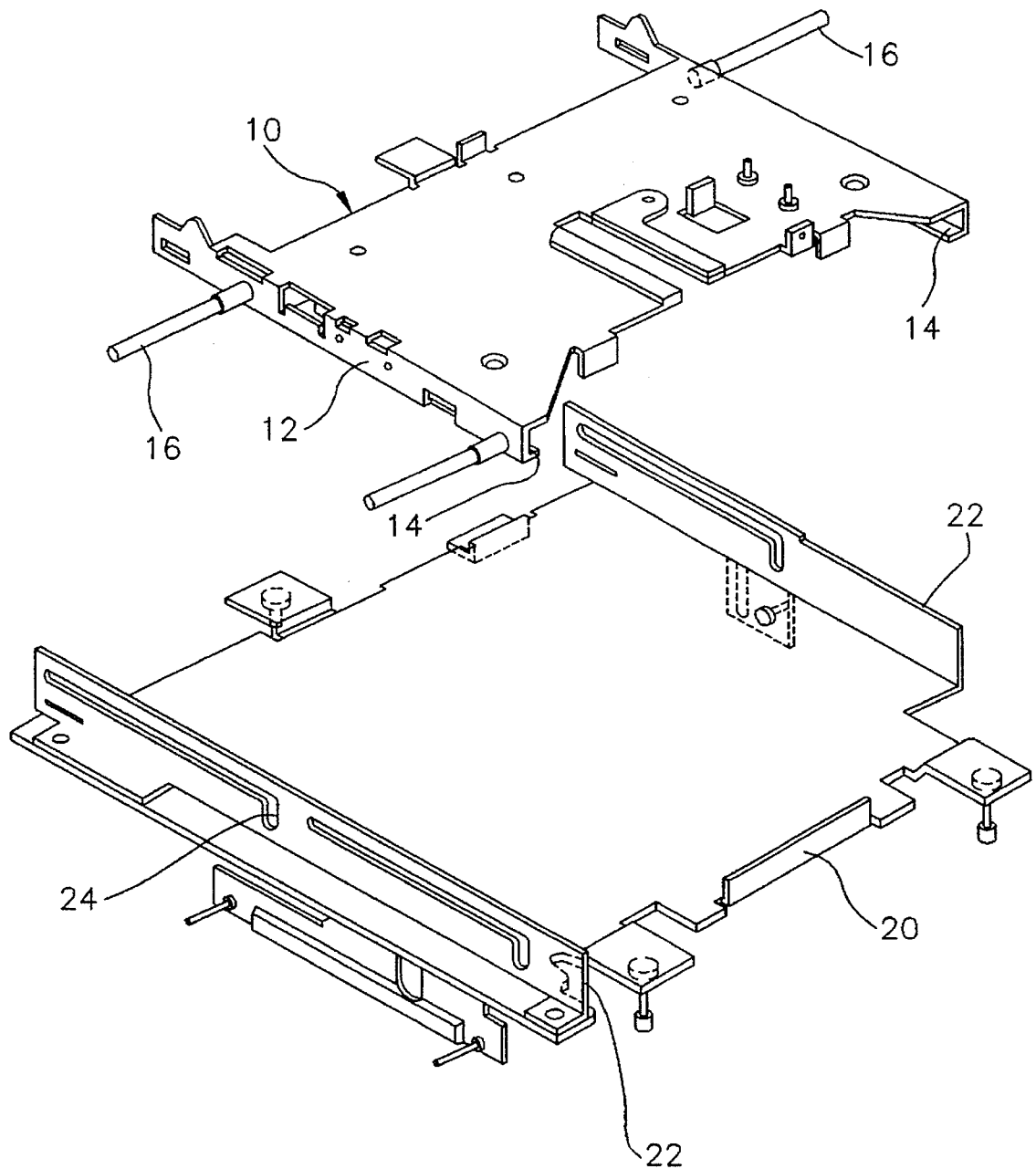
FIG. 1 is a schematic perspective view for showing a conventional disk tray.
Figure 2:
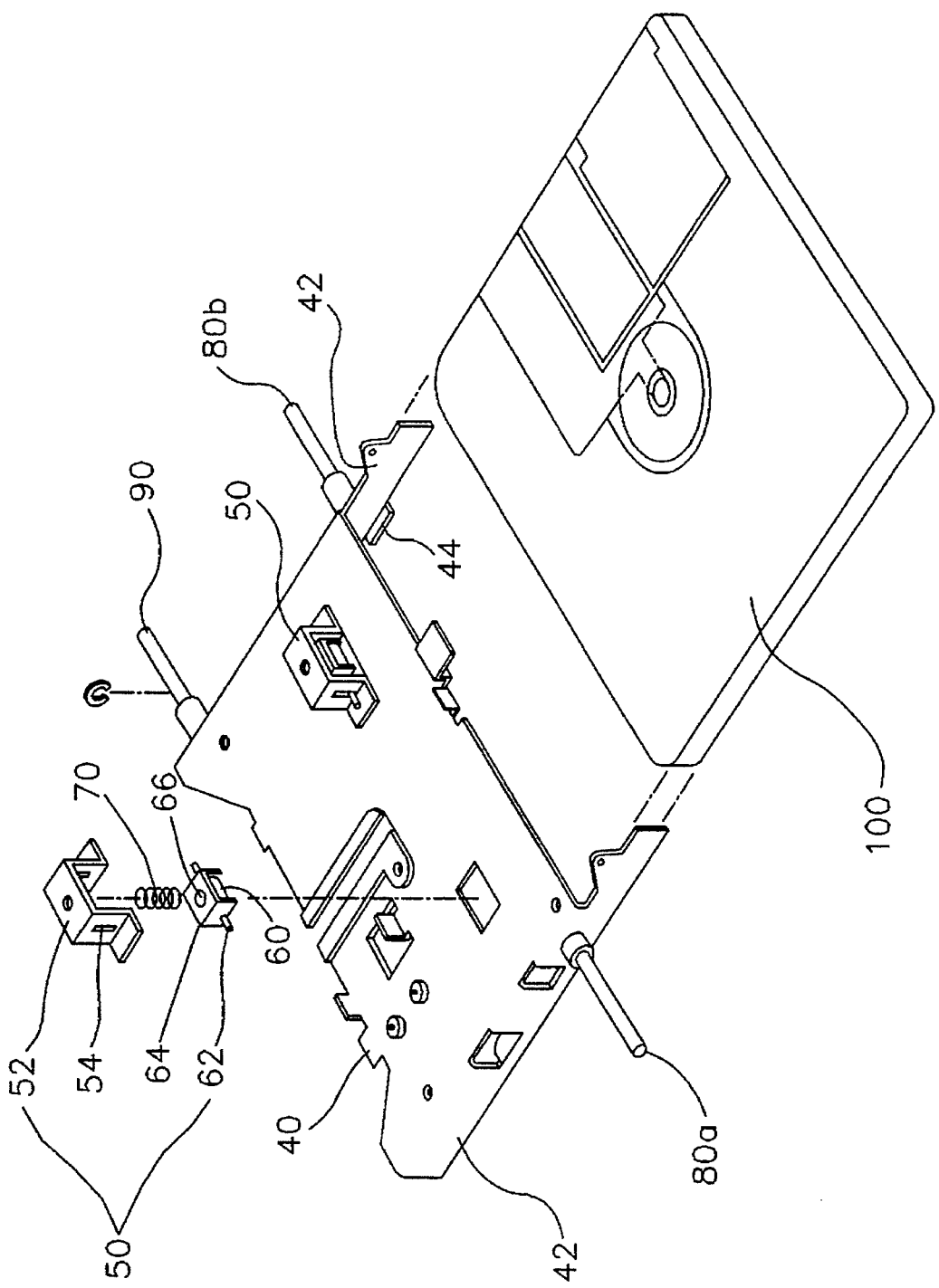
FIG. 2 is an exploded perspective view of a disk tray in accordance with an embodiment of the present invention.

FIG. 2 is an exploded perspective view of a disk tray in accordance with an embodiment of the present invention. The disk tray shown in the figure has a main body 40 of a hexahedron shape with front, rear and lower faces opened. From the lower ends of the side faces 42 of main body 40, cartridge supporting pieces 44 are extended to the inner portion of main body 40 for supporting a disk cartridge 100 which is inserted into or ejected from the disk tray. At an upper portion of main body 40, a guiding apparatus 50 for guiding disk cartridge 100 is elastically provided on an upper portion of main body 40 to reduce a friction between an upper portion of main body 40 and disk cartridge 100 occurred during an insertion or ejection of disk cartridge 100. Guiding apparatus 50 is rotatable due to the friction with disk cartridge 100.

Figure 3:
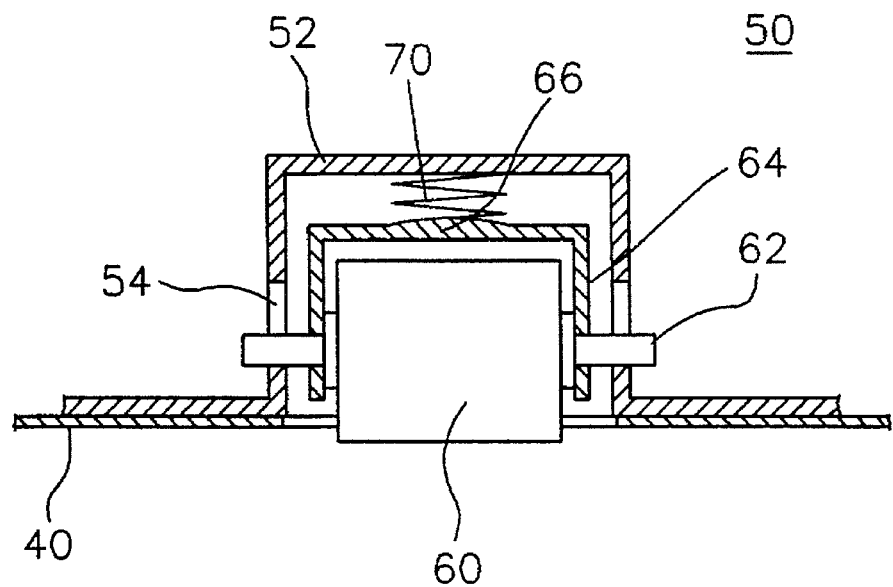
FIG. 3 is a sectional view for illustrating in more details the guiding apparatus as shown in FIG. 2 which is provided at an upper portion of main body 40 of the disk tray.

FIG. 3 is a sectional view for illustrating in more detail the guiding apparatus as shown in FIG. 2 which is provided at an upper portion of main body 40 of the disk tray. Referring to FIGS. 2 and 3, guiding apparatus 50 will be explained in more detail.

Guiding apparatus 50 includes a receiving portion 52 formed at an upper portion of main body 50 of the disk tray. Both side walls of receiving portion 52 are provided with a long hole 54 which is vertically extended. Guiding apparatus 50 also includes a roller 60 which is rotatable due to the friction with disk cartridge 100 during an insertion and ejection operation of disk cartridge 100. On both sides of roller 60, rotation shaft 2 is protrudingly formed. Roller 60 is inserted into a supporting bracket which supports rotatably roller 60 and is fixed thereto. Supporting bracket 64 is provided with a pair of holes at both sides thereof, through which rotation shaft 62 passes. Rotation shaft 2 is inserted into long hole 54 of receiving portion 52 so that roller 60 may move vertically. Roller 60 which is inserted into supporting bracket 64 and rotatably fixed thereto, is inserted into receiving portion 52 and partially exposed to outside of receiving portion 52 at a state that roller 60 does not contact with disk cartridge 100.

On an upper surface portion of supporting bracket 64, a protruding portion 66 for mounting a spring 70 is formed. Spring 70 is mounted around protruding portion 66 and installed between an upper surface of supporting bracket 64 and an inner lower surface of an upper portion of receiving portion 52.

In the meantime, a pair of guide rods 80a and 80b for guiding a movement of the disk tray are protrudingly formed on both opposing sides 42 of main body 40 of the disk tray. Guide rods 80a and 80b are inserted into a pair of guide holes (not shown) formed at both side walls of a body (not shown) of a disk player, to thereby guide the disk tray so that the disk tray may move along the guide holes.

Further, the shown disk tray includes at least one driving rod 90 on at least one side thereof for transmitting a driving force from a driving motor (not shown) installed at the body of the disk player to the disk tray.

In a preferred embodiment of the present invention, two guiding apparatuses 50 are formed at center portions of left and right sides of main body 40 of the disk tray. Further, a plurality of guiding apparatuses 50 may be formed as required.

Figure 4:
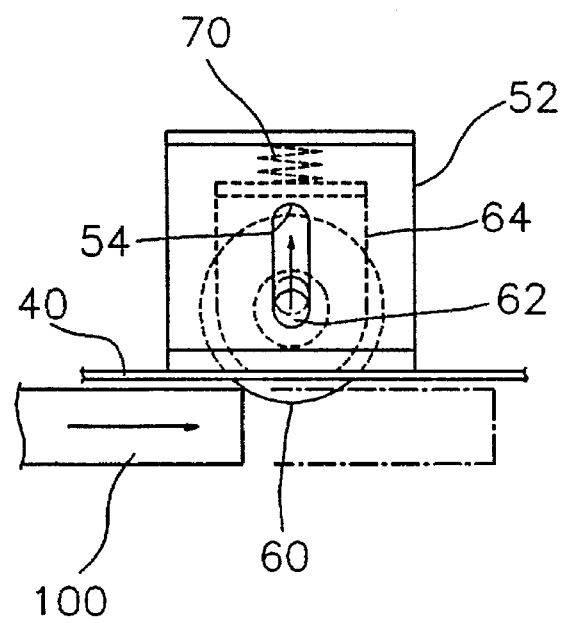
FIG. 4 is a side view for illustrating an operation of the guiding apparatus as shown in FIG. 3.

FIG. 4 is a side view for illustrating an operation of the guiding apparatus as shown in FIG. 3. Referring to FIGS. 2 and 4, an operation for inserting disk cartridge 100 into the disk tray according to the present invention, will be explained.

When disk cartridge 100 as shown in FIG. 2 is pushed into the disk tray from the front side of the disk tray, an upper surface of disk cartridge 100 comes in contact with roller installed at an inner upper portion of main body 40 of the disk tray. Then, roller 60 starts to rotate on the center of rotation shaft 62 so that the insertion of disk cartridge 100 is guided.

At this time, roller 60 and supporting bracket 64 are pushed upwardly in a range of a vertical width of long hole 54 of receiving portion 52 by the upper surface of disk cartridge 100. Here, spring 70 buffers a shook occurred when disk cartridge 100 comes contact with roller 60, to avoid the damages of disk cartridge 100 and the disk tray.

When disk cartridge 100 thus inserted in this manner is unloaded (or ejected), guiding apparatus 50 also guides the unloading of disk cartridge 100. When the unloading of disk cartridge 100 is completed, roller 60 and supporting bracket 64 recover their original locations thereof by the action of spring 70.

In accordance with the present invention, a guiding apparatus for guiding the operation of loading and unloading a disk cartridge is provided at an inner upper portion of the disk tray. The guiding apparatus rotates during the loading and unloading operation of the disk cartridge to thereby guide the loading and unloading operation of the disk cartridge. Further, the guiding apparatus buffers the shock occurred when the disk tray becomes in contact with the disk cartridge, to protect the disk tray and the disk cartridge. Accordingly, even when the disk tray is manufactured using a general material having a normal smoothness, the loading and unloading operation of the disk cartridge may be performed smoothly without any damage of the disk tray end the disk cartridge. As a result, the cost for manufacturing the disk tray can be lowered in view of its material and its working operation.

While the present invention has been particularly shown end described with reference to particular embodiments thereof, it will be understood by those skilled in the art that various changes in form and details may be effected therein without departing from the spirit and scope of the invention as defined by the appended claims.

What is claimed is:

1. A disk tray for receiving a disk cartridge comprising:

a main body having a hexahedron shape with front, rear and lower faces opened;

cartridge supporting pieces extending from lower ends of side faces of said main body to an inner portion of said main body for supporting the disk cartridge which is inserted into or ejected from the disk tray;

means for guiding the disk cartridge, elastically provided on an upper portion of said main body to reduce friction between the upper portion of said main body and the disk cartridge which occurs during an insertion or ejection of the disk cartridge, said guiding means being rotatable due to the friction with the disk cartridge, and said guiding means comprising:
- a roller rotatable due to the friction with the disk cartridge during the insertion or ejection of the disk cartridge,
- a receiving portion for receiving said roller provided on the upper portion of said main body, said receiving portion being provided with vertically extended holes at both side walls which a rotation shaft is inserted into,
- a supporting bracket for rotatably supporting said roller on both sides at both ends of a rotation axis of said roller, which the rotation shaft passes through, said supporting bracket being U-shaped, mounted within said receiving portion, and being provided at an upper surface portion with a protruding portion;
- a spring mounted on said protruding portion between said supporting bracket and an inner upper surface of said receiving portion for buffering a rotation of said roller, whereby said supporting bracket is vertically movable along the vertically extended holes during the insertion or ejection of the disk cartridge;
- a pair of guide rods for guiding movement of the disk tray, said guide rods being protrudingly formed on opposing portions of both sides of the disk tray and said guide rods being inserted into a pair of opposing guide holes formed at both sides of a body of a disk player; and
- a driving rod formed on at least one side of said disk tray for receiving a driving force from a driving motor of a body of the disk player.

2. A disk tray for receiving a disk cartridge comprising:
a main body having a hexahedron shape with front, rear and lower faces opened;
cartridge supporting pieces extending from lower ends of side faces of said main body to an inner portion of said main body for supporting the disk cartridge which is inserted into or ejected from the disk tray; and
means for guiding the disk cartridge, elastically provided on an upper portion of said main body to reduce a friction between the upper portion of said main body and the disk cartridge which occurs during an insertion or ejection of the disk cartridge, said guiding means being rotatable due to the friction with the disk cartridge, and said guiding means comprising:
- a roller rotatable due to the friction with the disk cartridge during the insertion or ejection of the disk cartridge,
- a receiving portion for receiving said roller provided at the upper portion of said main body, said receiving portion being provided with a pair of side walls and vertically extended holes at said side walls and said roller being provided with a rotation shaft which passes through holes in both sides of a supporting bracket and is inserted into the vertically extended holes, and said supporting bracket for rotatably supporting said roller on both sides at both ends of an rotation axis of said roller, said supporting bracket being U-shaped, mounted within said receiving portion and being provided at an upper surface portion with a protruding portion, and
- a spring mounted on the protruding portion between said supporting bracket and an inner upper surface of said receiving portion for buffering a rotation of said roller, whereby said supporting bracket is vertically movable along the vertically extended holes during the insertion or ejection of the disk cartridge.

3. The disk tray as claimed in claim 2, said disk tray further comprising a pair of guide rods for guiding movement of the disk tray, said guide rods being protrudingly formed on opposing portions of both sides of the disk tray and said guide rods being inserted into a pair of opposing guide holes formed at both sides of a body of a disk player.

4. The disk tray as claimed in claim 2, said disk tray further comprising a driving rod formed on at least one side of said disk tray for receiving a driving force from a driving motor of a body of a disk player.

* * * * *